Nov. 25, 1958 W. J. SCOTT 2,861,705
UNIVERSAL CONDUIT BOX
Filed Aug. 13, 1956 2 Sheets-Sheet 1
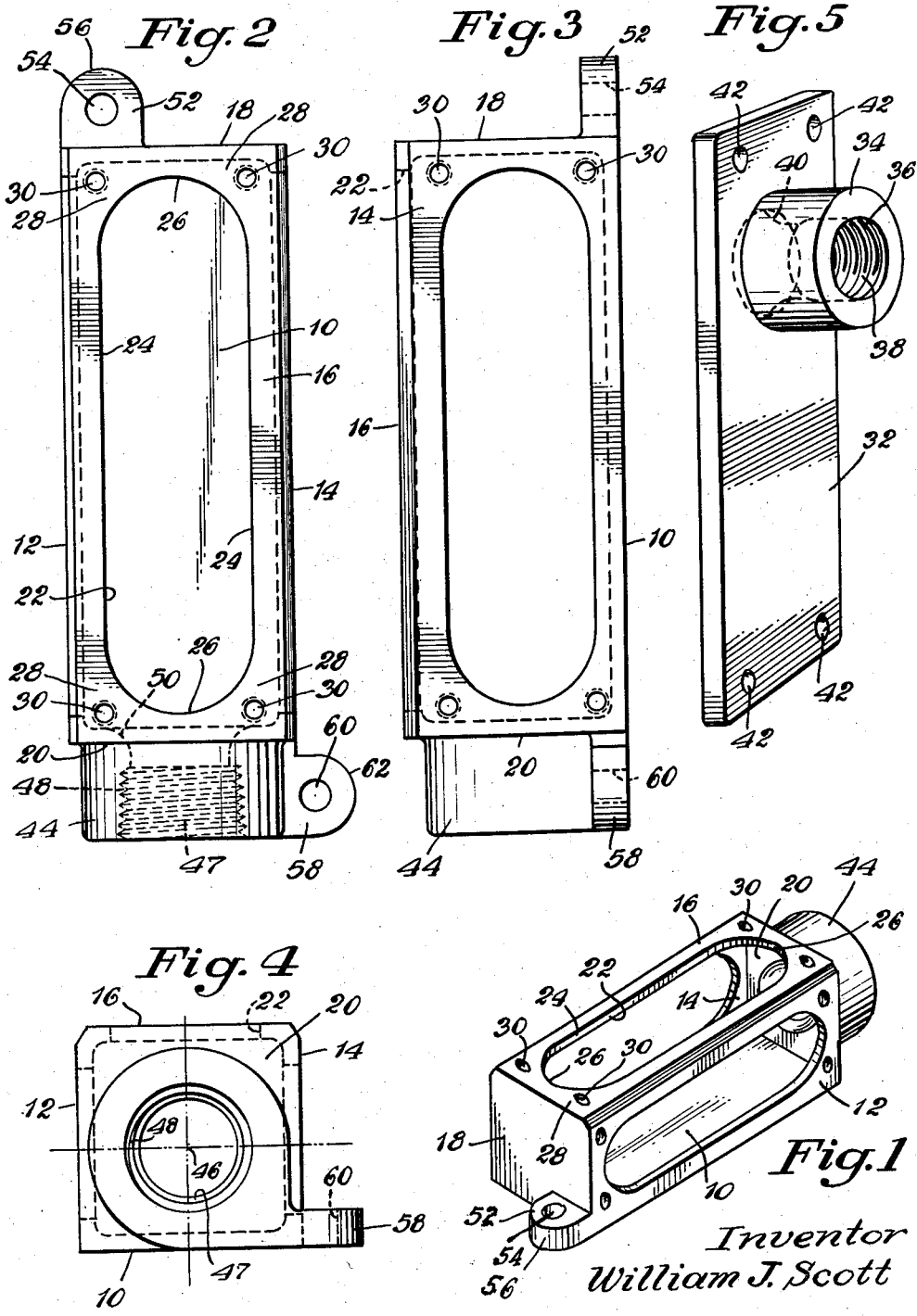
Inventor
William J. Scott
by Parker & Carter
Attorneys Nov. 25, 1958          W. J. SCOTT          2,861,705
UNIVERSAL CONDUIT BOX
Filed Aug. 13, 1956                    2 Sheets-Sheet 2
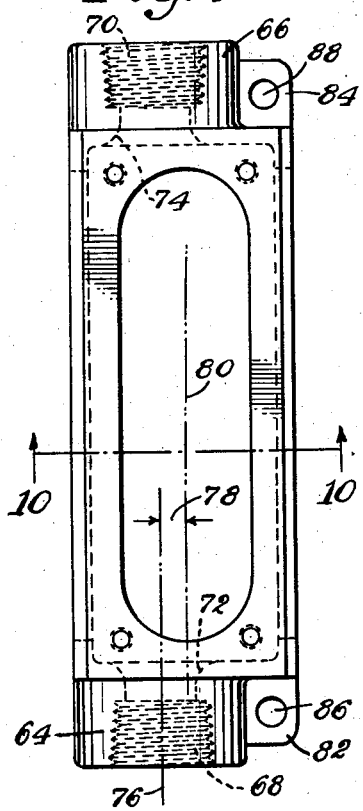
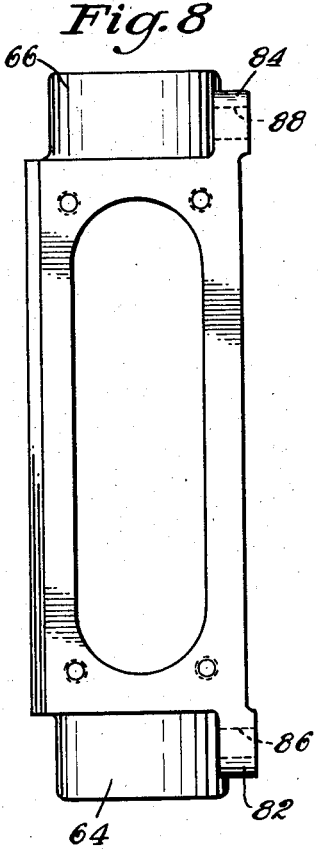
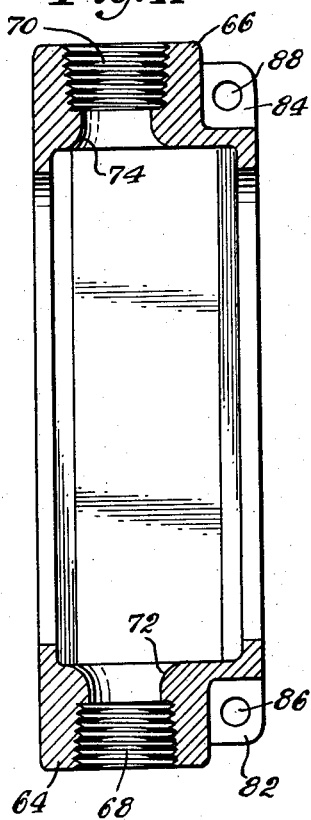
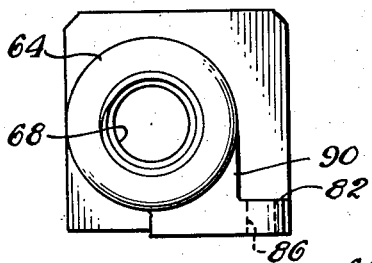
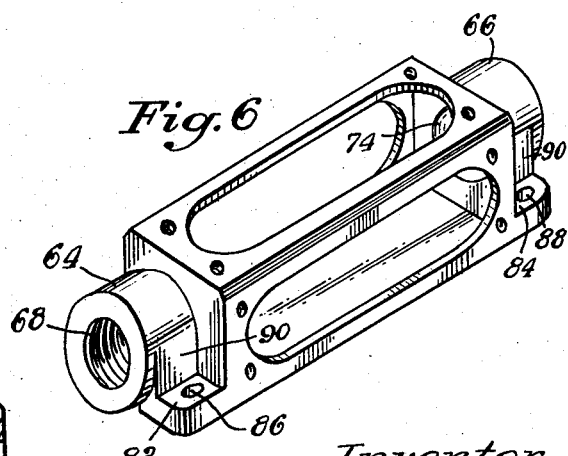
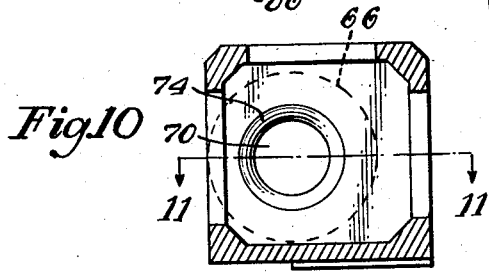
Inventor
William J. Scott
by Parker & Carter
Attorneys

United States Patent Office 2,861,705
Patented Nov. 25, 1958

2,861,705
UNIVERSAL CONDUIT BOX

William J. Scott, Sycamore, Ill., assignor to Ideal Industries, Inc., Sycamore, Ill., a corporation of Delaware Application August 13, 1956, Serial No. 603,539

2 Claims. (Cl. 220—3.9)

My invention is in the field of conduit box fittings and the like and is a new and improved pull box constructed to prevent injury to the insulation of the wires, but at the same time arranged for maximum versatility.

A primary object of my invention is a conduit pull box or the like with a solid base and three open sides to which, selectively, a plurality of interchangeable covers can be applied so that a maximum number of outlets at the proper locations can be provided.

Another object is a conduit pull box with aligned conduit hubs at each end.

Another object is a conduit box with the hub at only one end and mounting lugs to rigidly secure the box with the base flush against a flat surface, such as on a machine tool.

Another object is a pull box with conduit hubs that have well rounded flared entrances to protect the insulation on the wires.

Another object is a conduit box with a maximum number of open sides and a connecting arrangement for a number of covers so that every cover can be mounted on any one of the sides.

Another object is a conduit box with mounting lugs disposed to give a maximum rigidity.

Other objects will appear from time to time in the ensuing specification and drawings in which:

Figure 1 is a perspective of one form of my conduit pull box;
Figure 2 is a plan view of the box in Figure 1;
Figure 3 is a side view of Figure 2;
Figure 4 is an end view of Figure 2;
Figure 5 is a perspective view of one cover;
Figure 6 is a perspective of a variant form;
Figure 7 is a plan view of the box in Figure 6;
Figure 8 is a side view of Figure 7;
Figure 9 is an end view of Figure 7;
Figure 10 is a section taken along line 10—10 of Figure 7; and
Figure 11 is a section taken along line 11—11 of Figure 10.

In Figure 1, a conduit box is shown with a substantially flat base indicated generally at 10, rectangular in over-all appearance and somewhat elongated. The side walls 12 and 14 rise perpendicular from the longitudinal edges of the base and are interconnected across the top by a top wall 16 which is also generally at right angles to the side walls and somewhat parallel to the base. The box is closed by end walls 18 and 20 which are perpendicular generally to the base, the side walls and top wall to form what may be considered a frame.

It is important that the various walls and the base be formed integral with each other and I prefer that the box be cast as a single unit for strength and rigidity.

The side and top walls are each provided with an elongated oval opening. For example, the opening in the top wall is indicated at 22. The sides of the opening may have rectilinear edges 24 interconnected by semicircular ends 26 which together complete a somewhat oval opening. The top wall itself is rectangular and the circular edges at each end in the oval opening provide what I term triangular portions or areas at each corner indicated generally at 28. Four of these triangular areas are provided for each wall, one at each corner. Each such triangular portion or area may be provided with a threaded channel or screw hole indicated generally at 30. These channels should be uniformly arranged and for each wall they form what I term a rectangular pattern that is identical with, or substantially so, each of the rectangular patterns formed by the threaded channels on the other walls. For example, the rectangular pattern formed by the threaded channels or holes 30 in the top wall have the same dimensions as the pattern formed by the threaded holes for each of the side walls.

An example of a suitable cover has been shown in Figure 5. The cover has a substantially flat or coplanar base 32 with one or more hubs 34 rising on one surface, each with a central bore 36 opening into the box with a threaded exterior portion 38 to receive the threaded end of a pipe or conduit and a smooth, flared, well-rounded inner portion or lull 40 to protect the insulation on the wires when they are being pulled around a 90 degree corner. Each corner of the rectangular platelike cover is provided with a smooth channel or hole 42 which, as a group, form a rectangular pattern with the same dimensions as the rectangular pattern formed by the threaded holes or channels on the various walls of the box. Screws or other suitable fastening means can be inserted through these openings so that the cover may be firmly secured on any one of the sides of the box. If the box is to be used on a machine tool where a coolant or other liquid is being splashed around, a suitable gasket or insulation could be provided on the underside of the cover, if desired, to exclude moisture from the interior of the box, but this is not absolutely necessary.

The important point is that the cover in Figure 5 is merely an example and only one hub has been shown. Two or three such integral hubs could be disposed along the cover, if desired, suitably spaced. It might be desirable to completely blank off one side of the box and a cover could have no hubs at all and merely be a blank closure. In any event, each cover has the same pattern of screw openings so that it can be mounted on any one of the three sides of the box. Each box can be provided with any number of suitable covers so that they can be selectively arranged to meet the requirements of a particular job. All three sides of the box are open so that the box has versatility, and a maximum number of wires can be fed through as many as three conduits connected to each side, making a total of nine, although this is an extreme case.

The end wall 20 is provided with a conduit hub 44 which is concentric with the center line 46 of the box. This hub, like the hub on the cover, has a central bore 47 initially threaded in its outer portion 48 and flared outwardly and smoothed as at 50 where it opens into the box to protect the insulation of the wires being pulled through a 90 degree turn.

The box is provided with mounting lugs or anchoring tabs at each end. For example, in Figure 2 the lug 52 is coplanar with the base and extends longitudinally beyond the end wall 18. The lug is formed so that it does not project laterally beyond the side wall 12, but at the same time it is integrally formed with the base and end wall and has a suitable opening at 54 and a rounded end surface or edge 56.

A lug 58 at the other end of the box is aligned laterally with the hub and projects laterally beyond the side walls. This lug also has a suitable central opening 60 with a well-rounded edge 62. In this case, the lug does not project longitudinally beyond the end of the hub, but it does extend laterally beyond the side wall 14.

In Figure 6, I have shown a perspective of a variant form in which the base, side walls, top wall and end walls may be arranged somewhat as before, all integral, possibly cast, and generally perpendicular to each other defining an elongated four-sided box with long oval openings on three sides and the triangular corner portions so that a plurality of covers can be selectively attached.

In this form, both of the end walls are provided with conduit-receiving hubs, indicated generally at 64 and 66, with aligned central openings 68 and 70, each being outwardly threaded and then flared or well-rounded as at 72 and 74 to protect the insulation on the wires.

The hubs and their openings have the same center line or are concentric as at 76, but the center line is offset a distance 78 from the box center line 80.

The mounting lugs 82 and 84 at each end are somewhat aligned next to each of the hubs but laterally arranged so that they terminate along one edge of the side wall, as shown in Figure 7. Each lug may be provided with a central opening 86 and 88 to receive a suitable screw or other mounting means and may have a rounded corner, if desired. As shown in Figure 9, each lug is formed integrally with and forms an extension of the base, but at the same time a suitable web 90 rigidly interconnects it with its adjacent lug for stability and rigidity.

As shown in Figure 8, the lower surface of each lug may be offset or spaced slightly from the lower surface of the base so that the box, when mounted, will rest directly on the lug rather than the base, although this is a matter of choice.

In this form, like the previous one, the box is entirely integral and preferably cast. But lugs are provided at each end laterally next to hubs which project from the end wall. The hubs are offset slightly but aligned so that the lugs will fall within the lateral dimensions of the box.

The use, operation and function of my invention are as follows:

I provide a conduit pull box or the like which has a maximum versatility. The lower side or base is solid and rigid and effects a firm foundation. Integral lugs are provided on the base so that the entire pull box can be firmly mounted on a machine, for example a lathe.

Rising above the base but formed integrally with it are three walls, a pair of side walls somewhat parallel and at right angles to the base and a top wall which is parallel to the base but integral with the side walls. All three walls are open and the covers can be interchanged from one wall to another. Thus, each box may be fitted with one of a large number of covers having any desired number of hubs up to three and possibly none at all if one wall is to be blanked off.

It is important that the base have an unobstructed lower surface so that it can be firmly mounted on the side or top of a machine, or the like. At the same time, the three walls must also be open so that they can selectively receive any one of the covers. Therefore, the hubs enter the end wall, either one or both, and the mounting lugs should also be on the end walls and related to the hubs so that any vibration or rattling of the conduit or pipe will be transmitted directly to the mounting screws before it reaches the box.

The channels through each of the hubs are provided with well-rounded, flared entrance portions so that the insulation of the wires will not be ripped or damaged.

While I have shown and described the preferred form and one modification of my invention, it should be understood that many changes can be made. It should also be noted that the hubs or lugs on the covers are intended to connect with conduits or pipes. Thus the torques and tensions imposed on the pipes will extend to the covers. This, in turn, requires that the covers be firmly and rigidly mounted on the open sides of the box.

Another important advantage is the positioning of the lugs in the Figure 7 form. Lugs 82 and 84 are within the dimensions of the box, consequently, the side surfaces or outside walls can be easily machined so that the cover will form a vapor or moisture tight fit. During machining, the lugs will not be in the way. Another advantage is that the opposite wall can be placed against or next to an upright, and the box can be firmly mounted because the lugs 82 and 84 will be on the outside.

The multiple connections for each of the tops are important to take the tension load from the conduits connected to the covers.

The covers could have a gasket on the lower surface which would form a vapor tight seal with the machined outer surface of the box to exclude coolants, oils and various other foreign material, where necessary.

With these and numerous additional modifications, substitutions, alterations and changes in mind, I wish that the invention be unrestricted except as by the appended claims.

I claim:

1. In a pull box fitting, a rectangular substantially flat elongated solid base, a frame above the base and integral with it, the frame and base being generally symmetric about a center line, the frame including opposed parallel upright side and end walls perpendicular to the general plane of the base, and a top wall integral with and at right angles to the plane of the side and end walls but generally parallel to the plane of the base, elongated openings in the top and side walls, means for securing any selected one of a plurality of cover plates having various combinations of hubs thereon over each of the elongated openings, at least one conduit receiving hub integral with one of the end walls and having a center line generally parallel but offset to one side of the center line of the frame and base, one side of each hub being generally flush with the side wall of the frame in the direction of the hub's offset, and an anchor lug integral with the said one end wall and the hub and disposed on the other side of the frame's center line from the hub, such lug extending longitudinally from the base and being generally laterally flush with the other side wall.

2. In a pull box fitting, a rectangular substantially flat elongated solid base, a frame above the base integrally formed with it, the frame and base being generally symmetric about a center line, the frame including opposed parallel upright side and end walls generally perpendicular to the base, and a top wall integral with and generally at right angles to the side and end walls and generally parallel to the base, elongated openings in the top and side walls, means for securing any selected one of a plurality of cover plates over each of the elongated openings, longitudinally aligned conduit receiving hubs offset to one side of the center line of the fitting, one such hub being integral with and projecting from each end wall, the aligned hubs having a common center line that is generally parallel but offset to one side of the center line of the frame and base, one side of each hub being generally flush with the side wall of the frame in the direction of the hub's offset, and anchor lugs, one integral with each end wall of the frame, on the other side of the frame's center line from the aligned hubs, each such lug extending from the base, aligned laterally with and integral with the hub at that end, and being generally laterally flush with the side wall on the other side of the frame.

References Cited in the file of this patent

UNITED STATES PATENTS

| 1,777,504 | Selah | Oct. 7, 1930 |
| 2,538,088 | Desloge | Jan. 16, 1951 |